US012024834B2

(12) United States Patent
Impero

(10) Patent No.: US 12,024,834 B2
(45) Date of Patent: Jul. 2, 2024

(54) ROAD SAFETY BARRIER ASSEMBLY FOR DETECTING AN IMPACT OF A VEHICLE

(71) Applicant: Pasquale Impero, Acerra (IT)

(72) Inventor: Pasquale Impero, Acerra (IT)

( * ) Notice: Subject to any disclaimer, the term of this patent is extended or adjusted under 35 U.S.C. 154(b) by 512 days.

(21) Appl. No.: 17/431,857

(22) PCT Filed: Feb. 20, 2020

(86) PCT No.: PCT/IB2020/051432
§ 371 (c)(1),
(2) Date: Aug. 18, 2021

(87) PCT Pub. No.: WO2020/170191
PCT Pub. Date: Aug. 27, 2020

(65) Prior Publication Data

US 2022/0145558 A1 May 12, 2022

(30) Foreign Application Priority Data

Feb. 21, 2019 (IT) ........................ 102019000002501

(51) Int. Cl.
*E01F 15/04* (2006.01)
*G01B 7/16* (2006.01)
*G08G 1/01* (2006.01)

(52) U.S. Cl.
CPC ............ *E01F 15/0453* (2013.01); *G01B 7/18* (2013.01); *G08G 1/0104* (2013.01)

(58) Field of Classification Search
CPC ....... E01F 15/0453; E01F 15/04; E01F 15/02; E01F 15/0423; E01F 15/0484; E01F 15/06; E01F 9/631; G01B 7/18; G08G 1/0104
See application file for complete search history.

(56) References Cited

U.S. PATENT DOCUMENTS 7,603,950 B2 * 10/2009 Dukart .................. B60R 21/013 102/210
10,982,399 B1 * 4/2021 Burks ..................... E01F 15/06
(Continued)

FOREIGN PATENT DOCUMENTS

EP 1167629 A2 1/2002
EP 1496487 A2 * 1/2005 ........... G08B 25/006
(Continued)

*Primary Examiner* — Abigail A Risic
(74) *Attorney, Agent, or Firm* — Endurance Law Group PLC

(57) ABSTRACT

Road safety barrier assembly has a barrier and an electric circuit that can be supplied with direct current. The circuit includes an outward electric cable and a return electric cable, and sensors along the barrier for detecting impact of a vehicle against respective portions of the barrier, each sensor causing upon impact detection a switching of electric current from the outward electric cable towards the return electric cable at the respective portion of the barrier. A device is arranged so as to measure a voltage value between the outward electric cable and the return electric cable upstream of the sensors. A control unit is predisposed to receive a signal indicating the voltage value measured by the voltage measuring device and is configured to calculate the distance between the voltage measuring device and the location of impact against the road safety barrier, by applying Ohm's Law.

7 Claims, 6 Drawing Sheets

(56) References Cited

U.S. PATENT DOCUMENTS

| | | | | | |
|---|---|---|---|---|---|
| 2002/0079905 | A1* | 6/2002 | Brown | H01B 7/328 |
| | | | | 324/543 |
| 2022/0065686 | A1* | 3/2022 | Lynch | G01H 1/00 |
| 2023/0237905 | A1* | 7/2023 | Kellari | G08G 1/0116 |
| | | | | 701/24 |

FOREIGN PATENT DOCUMENTS

| | | | | | |
|---|---|---|---|---|---|
| EP | 2253762 | A1 | * | 11/2010 | E01F 15/0423 |
| EP | 2253762 | A1 | | 11/2010 | |
| FR | 2721129 | A1 | | 12/1995 | |
| FR | 3052466 | A1 | | 12/2017 | |
| WO | WO-2010131126 | A1 | * | 11/2010 | E01F 15/0423 |

* cited by examiner

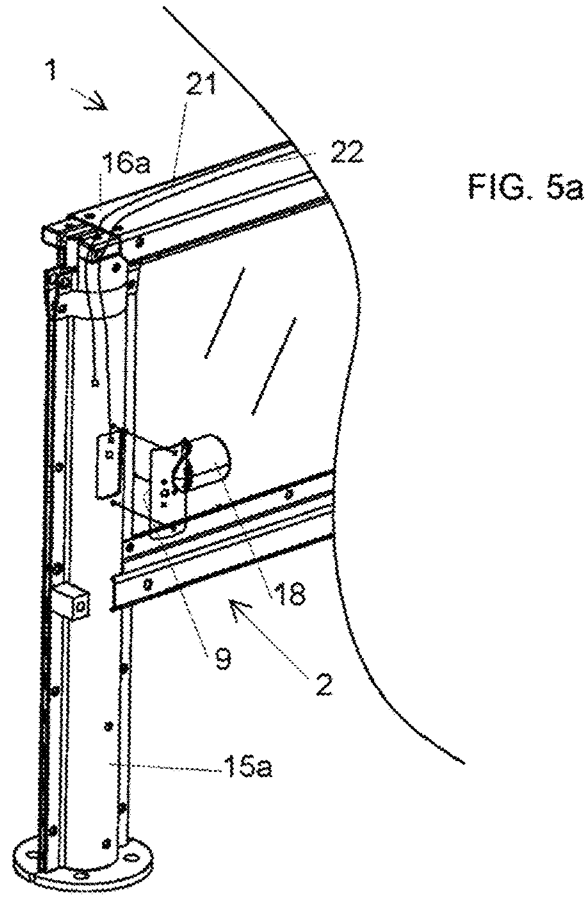
FIG. 5a
FIG. 7
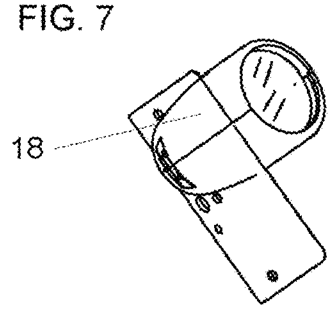
FIG. 6
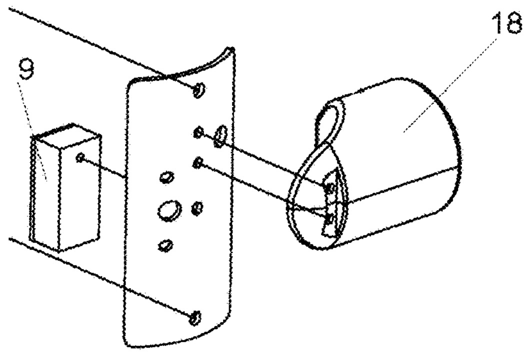
FIG. 8
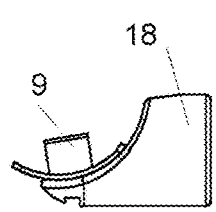

ROAD SAFETY BARRIER ASSEMBLY FOR DETECTING AN IMPACT OF A VEHICLE

FIELD OF THE INVENTION

The present invention relates to the technical sector concerning road safety barriers which extend along a side of a road so as to redirect vehicles which, for unexpected causes, skid or swerve with respect to the correct travel trajectory. In particular the present invention relates to a road safety barrier assembly for detecting an impact of a vehicle.

DESCRIPTION OF THE PRIOR ART

A road safety barrier is known by the term "guard rail", comprising: a series of uprights which are planted in the ground, at a certain distance from one another and by the side of the road, and a series of undulating tapes that are fixed to the above-mentioned uprights in such a way as to be consecutive to one another. The undulating tapes are reciprocally fixed to one another so to form a continuous front.

In the event of an impact of a vehicle against the road safety barrier, the need arises to identify the portion of the road safety barrier in which the impact has taken place, so that the occupants of the impacting vehicle, or those of following vehicles, can provide indications to emergency aid operatives who are approaching the location of the impact. For this purpose, road signs are usually arranged along the roads, at least at every kilometre, which enable identification of each relative road portion.

If the emergency aid services are called, for example due to the presence of injured persons, then the road maintenance team is usually informed of the accident and carries out an inspection of the location of the accident so as to repair, if necessary, the damaged portion of road safety barrier.

In the cases in which the emergency aid services are not called, usually nobody informs the road maintenance team and the portion of road safety barrier involved with the impact may not perform its function, which can be prejudicial for the safety of occupants of another vehicle that might impact the same portion of road safety barrier, at a time following that of the first impact.

In the attempt to obviate this drawback, employees of the maintenance team can regularly patrol a road to seek out any portions of road safety barrier that have been damaged following an impact with a vehicle. At times, however, portions of road safety barrier that are damaged and which need repair are not seen by those responsible. Further, this "patrol" service is carried out mostly on motorways and not on secondary roads.

SUMMARY OF THE INVENTION

The aim of the present invention consists in obviating the above-described drawbacks.

The above aim is obtained by means of road safety barrier assembly for detecting an impact of a vehicle according to claim 1.

The present invention advantageously enables detecting the impact of a vehicle against a road safety barrier in real-time. Further, the portion of road safety barrier where the impact took place can be identified.

In fact, by knowing the direct current value with which the electric circuit is supplied and the voltage value measured by the voltage measuring device, and by applying Ohm's Law, the electrical resistance value that the portion of electric circuit has can be calculated up to the portion of road safety barrier where the vehicle impact took place, at the point where the circulating current on the outward electric cable was switched onto the return electric cable. Once this electrical resistance value is known, the length of the portion of electric circuit flowed through by the electric current can be calculated (Ohm's second Law), i.e. the length that the outward electric cable and the return electric cable have up to the portion of road safety barrier where the impact took place; and, with the resistivity and the section of the outward electric cable and the return electric cable being known, a good approximation of the distance can be calculated (by dividing the length obtained by a factor of two) between the voltage measuring device and the portion of road safety barrier where the impact took place.

BRIEF DESCRIPTION OF THE DRAWINGS

Specific embodiments of the invention will be described in the following part of the present description, according to what is recited in the claims and with the aid of the appended tables of drawings, in which:

FIGS. 5*a* and 5*b* are larger-scale views of details W and Z of FIG. 1;

FIGS. 6-8 are perspective views of some components that are visible in FIG. 5*a;*

DESCRIPTION OF THE PREFERRED EMBODIMENTS

Figure 1:
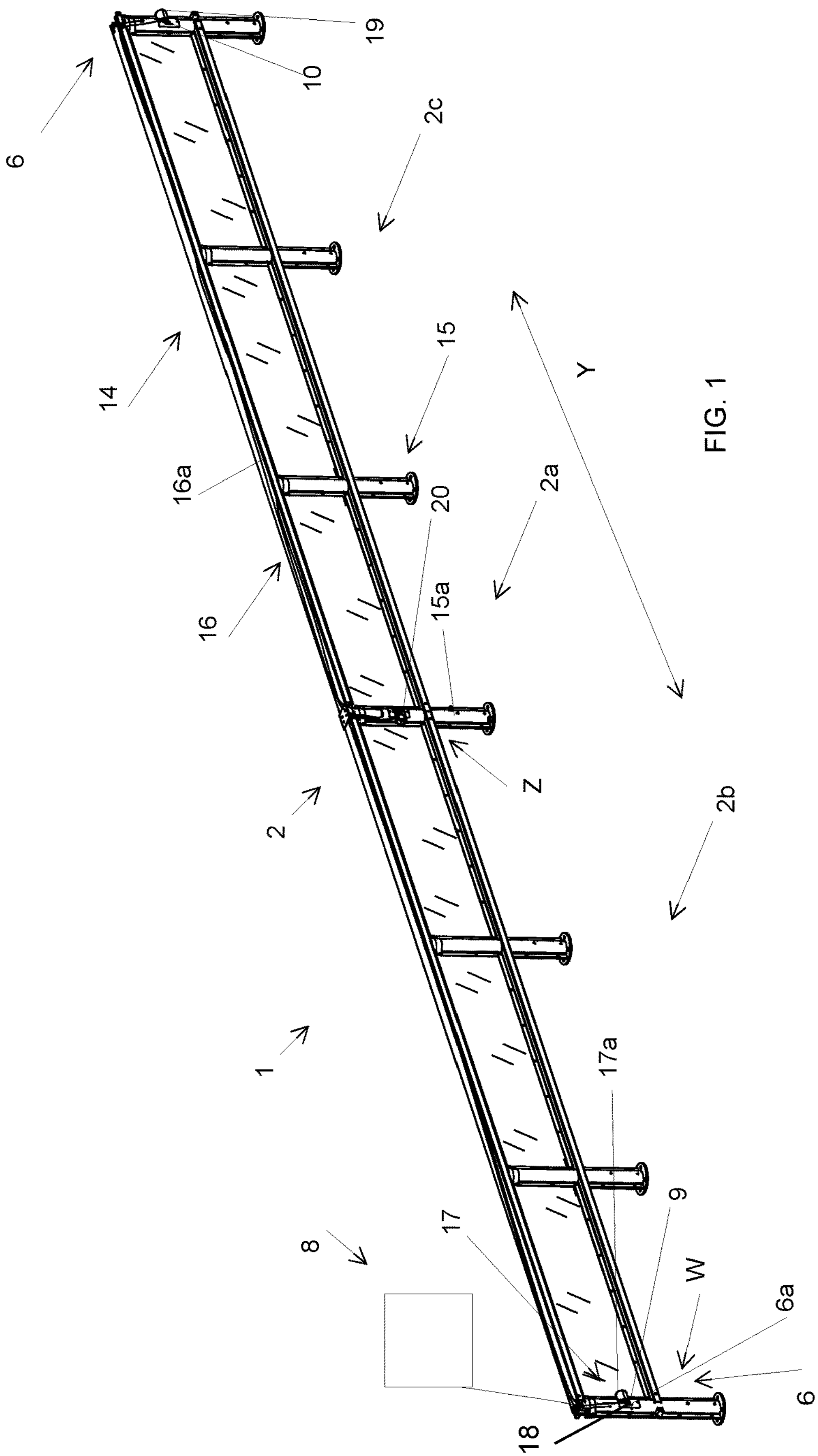
FIG. 1 is a perspective view of a road safety barrier assembly of the present invention.

With reference to the appended tables of drawings, reference numeral (1) denotes a road safety barrier assembly for detecting an impact of a vehicle, object of the present invention, comprising: a road safety barrier (2); an electric circuit (3) that can be supplied with direct current, comprising: an outward electric cable (4) for feeding the electric current and a return electric cable (5) for the return of the electric current, the outward electric cable (4) and the return electric cable (5) both running along the road safety barrier (2); a plurality of impact detecting sensors (6) which are distributed along the road safety barrier (2), so that each impact detecting sensor (6*a*) of the plurality of impact detecting sensors (6) is able to detect an impact of a vehicle against a portion (2*a*) of road safety barrier (2) in which the impact detecting sensor (6*a*) is located; each impact detecting sensor (6*a*) of the plurality of impact detecting sensors (6) being connected to the electric circuit (3) so that, if it detects an impact of a vehicle against the portion (2*a*) of road safety barrier (2) in which it is located, it causes a switching of the electric current coming from the outward electric cable (4) towards the return electric cable (5) at the same portion (2*a*) of road safety barrier (2); a voltage measuring device (7) which is arranged so as to measure a voltage value between the outward electric cable (4) and the return electric cable (5) upstream of the plurality of impact detecting sensors (6); a control unit (8) which is predisposed to receive a signal indicating the voltage value measured by the voltage measuring device (7) and which is configured to calculate the distance between the voltage measuring device (7) and the portion (2*a*) of the road safety barrier (2) at which the impact took place, by applying Ohm's Law (see FIGS. 1-4).

In other words, the road safety barrier assembly (2) can be subdivided into a plurality of portions, and an impact detecting sensor (6*a*) of the plurality of impact detecting sensors (6) is located in each portion (2*a*).

It is specified that by road safety barrier (2) is meant a road safety barrier having a longitudinal extension.

In other words, by road safety barrier (2) is meant a barrier that can be located along a side of a carriageway and can extend along the side of a carriageway.

Further, by road safety barrier (2) is meant a barrier configured to redirect, on the carriageway, the vehicles that impact laterally on the road safety barrier (2) so that the vehicle can maintain the direction of motion of the carriageway.

The voltage measuring device (7) preferably provides in output a signal indicating the voltage value measured.

The control unit (8) is preferably connected to the voltage measuring device (7) so as to receive the signal indicating the voltage value measured.

Each portion (2*a*) preferably has a predefined length and the impact detecting sensors (6*a*) of the plurality of impact detecting sensors (6) are distributed uniformly along the road safety barrier (2).

In FIG. 1, from left to right: a first impact detecting sensor (9) of the plurality of impact detecting sensors (6); a half of a first portion (2*b*) of road safety barrier (2) in which the first impact detecting sensor (9) of the plurality of impact detecting sensors is located (6); a half of a second portion (2*c*) of road safety barrier (2) in which a second impact detecting sensor (10) of the plurality of impact detecting sensors is located (6); and the second impact detecting sensor (10) of the plurality of impact detecting sensors (6).

Figure 9:
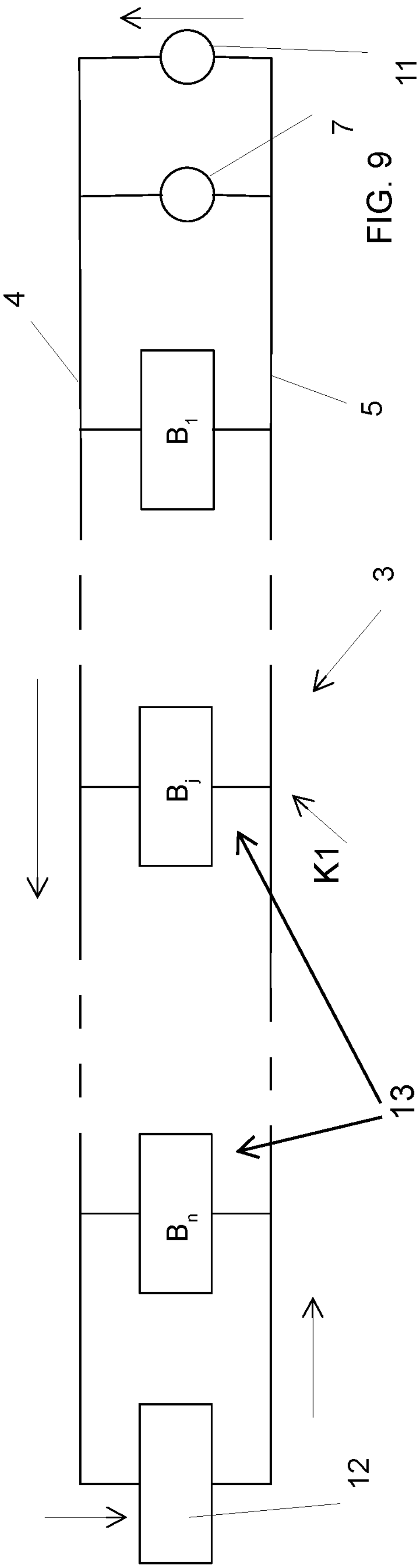
FIG. 9 is a schematic view of the electric circuit of the road safety barrier assembly of FIG. 1 in a first operating condition.

The electric circuit (3) can be powered in 10 mA direct current by a direct current generator (11), see FIG. 9.

Figure 5B:
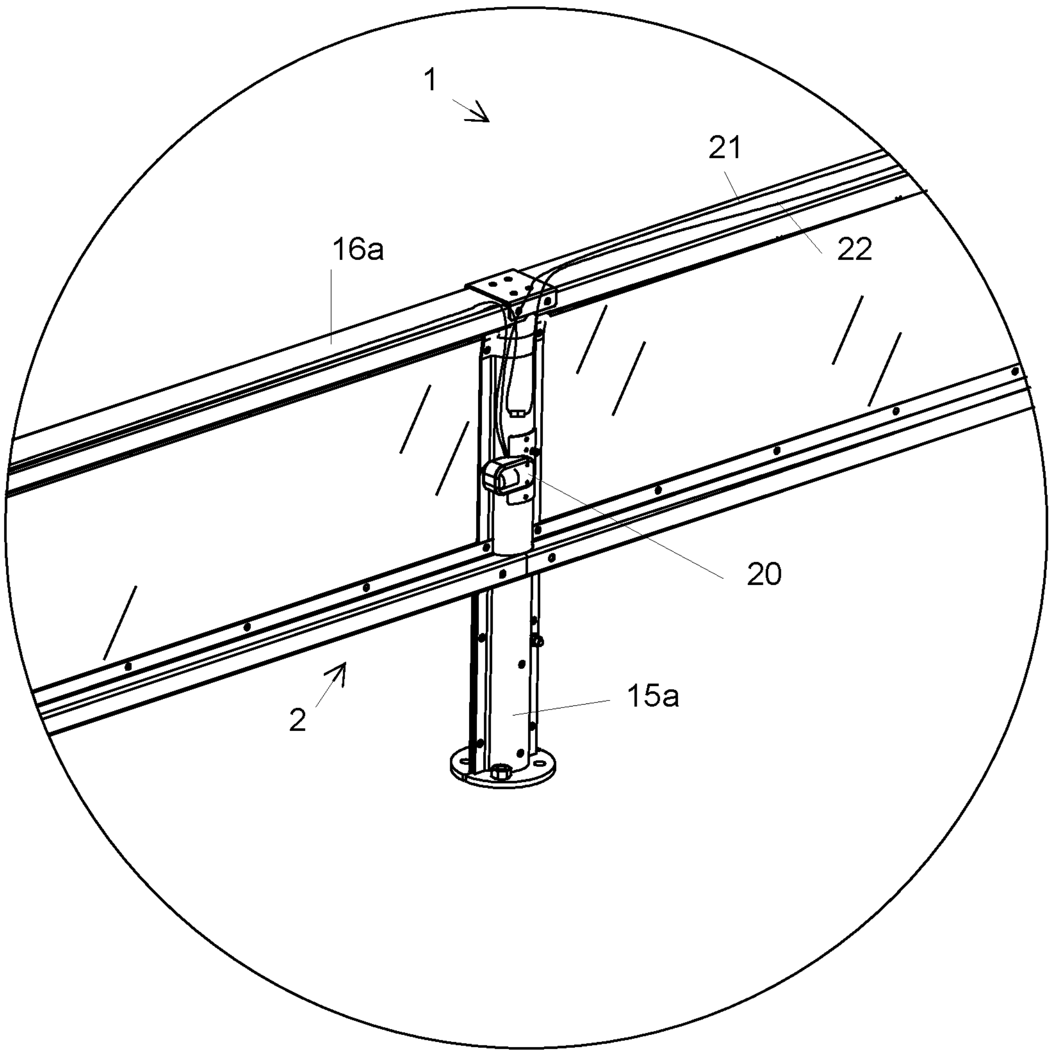

The outward electric cable (4) and the return electric cable (5) preferably run along the road safety barrier (2) together, for example flanked (see FIGS. 1, 5*a* and 5*b*).

Still more preferably, the outward electric cable (4) and the return electric cable (5) are parallel to one another.

The outward electric cable (4) and the return electric cable (5) are preferably laid so as to be parallel to the extension direction (Y) of the road safety barrier (2) (see FIG. 1).

If the outward electric cable (4) and the return electric cable (5) run flanked and parallel to one another, in a straight trajectory, the operations for calculating the distance between the voltage measuring device (7) and the portion of the road safety barrier (2) against which the impact has taken place are advantageously facilitated.

The outward electric cable (4) and the return electric cable (5) are preferably borne by the road safety barrier (2).

The impact detecting sensors (6*a*) of the plurality of impact detecting sensors (6) are borne by the road safety barrier (2).

The voltage measuring device (7) preferably comprises a voltmeter.

The voltage measuring device (7) can be arranged to measure the voltage at the heads of the electric circuit (3).

The position the voltage measuring device (7) assumes "upstream" of the plurality of impact detecting sensors (6) is understood to mean with respect to the power supply direction of the electric current, when the electric circuit (3) is powered.

The electric circuit (3) preferably comprises a termination module (12) (FIG. 9) which is arranged downstream of the plurality of impact detecting sensors (6), which connects the outward electric cable (4) with the return electric cable (5) and which has a determined electrical resistance value, so as to close the electric circuit (3).

The position the termination module (12) assumes "downstream" of the plurality of impact detecting sensors (6) is understood to mean the power supply direction of the electric current, when the electric circuit (3) is supplied.

This advantageously enables monitoring the status of the electric circuit (3): for example, if the return electric cable (5) is damaged, causing the opening of the electric circuit (3), the voltage measured by the voltage measuring device (7) tends to zero, which can be detected by the control unit (8) in real-time.

In other words, given the presence of the termination module (12), the calculation of an electrical resistance value that is not constant but significantly increases might be an indicator of the fact that the electric circuit (3) has been interrupted or in some way damaged.

The termination module (12) can be borne by the road safety barrier (2) together with the impact detecting sensor (6*a*) of the plurality of impact detecting sensors (6) which is arranged downstream of the remaining impact detecting sensors (6*a*) of the plurality of impact detecting sensors (6).

The impact detecting sensors (6*a*) of the plurality of impact detecting sensors (6) are preferably piezoelectric and in the event of an impact they can provide an electrical voltage in output.

Alternatively, the impact detecting sensors (6*a*) of the plurality of impact detecting sensors (6) can be accelerometers.

Once a vehicle impacts against a road safety barrier (2), the vehicle subjects the road safety barrier (2) to a mechanical stress. In turn, the piezoelectric sensor is subjected to this mechanical stress, which acts on the piezoelectric crystal present in the piezoelectric sensor: under the effect of this mechanical stress, the piezoelectric crystal compresses and returns an electrical voltage that is proportional to the applied mechanical stress.

The electric circuit (3) preferably comprises a plurality of electric switches (13) (FIG. 10); each electric switch (13*a*) of the plurality of electric switches (13) connects the outward electric cable (4) with the return electric cable (5) and is commanded to close by an associated impact detecting sensor (6*a*) of the plurality of impact detecting sensors (6) in order to switch the electric current coming from the outward electric cable (4) towards the return electric cable (5).

Figure 10:
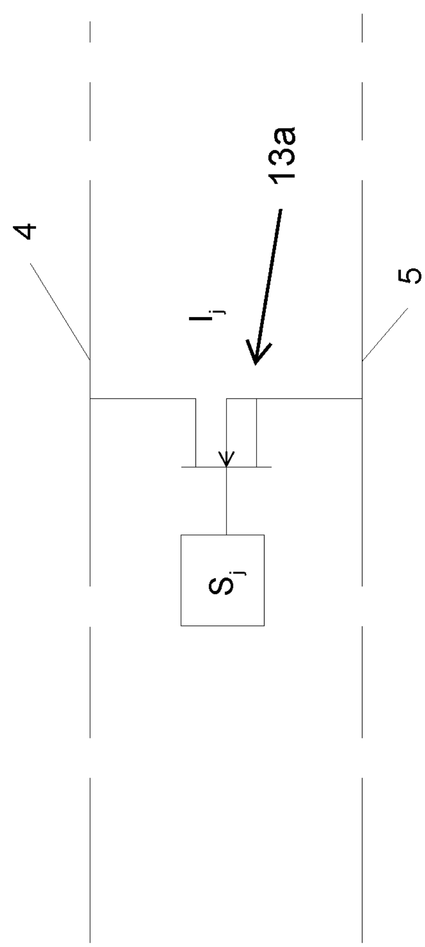
FIG. 10 is a more detailed view of detail K1 of FIG. 9.

Each electric switch (13*a*) of the plurality of electric switches (13) is preferably a transistor, see FIG. 10.

Once a vehicle impacts against a road safety barrier (2), the impact detecting sensor (6*a*) detects the impact and in turn returns an electric voltage value which closes the transistor.

Each electric switch (13*a*) of the plurality of electric switches (13) preferably connects the outward electric cable (4) with the return electric cable (5) so that when it is commanded to close by an associated impact detecting sensor (6*a*) of the plurality of impact detecting sensors (6), it places the outward electric cable (4) and the return electric cable (5) in short circuit with one another.

This advantageously simplifies the calculation of the resistance that the portion of electric circuit (3) has up to the portion (2*a*) of road safety barrier (2) in which the vehicle impact took place, i.e. where the circulating electric current on the outward electric cable (4) is switched onto the return electric cable (5).

The road safety barrier (2) can comprise: a plurality of re-directing elements (14) for re-directing a vehicle which impacts against the road safety barrier (2); a plurality of support elements (15) for supporting the plurality of re-directing elements (14); a plurality of containing elements (16) for containing the outward electric cable (4) and the return electric cable (5), which extend longitudinally and which are borne by the plurality of support elements (15) (FIGS. 1-4, 5*a*, 5*b*).

The plurality of containing elements (16) advantageously ensures protection of the outward electric cable (4) and the return electric cable (5) from both any impacts of the vehicles against the road safety barrier (2) and from atmospheric phenomena.

Each support element (15*a*) of the plurality of support elements (15) can have a vertical extension axis and can rise upwards starting from the road.

The road safety barrier assembly (1) preferably comprises a plurality of light signalling electronic devices (17, 17*a*, 18, 19) which are distributed along the road safety barrier (2) and which are connected to the control unit (8) so that in a case of impact of a vehicle against the road safety barrier (2), at least a part thereof, arranged upstream of the portion (2*a*) of road safety barrier (2) in which the impact took place with respect to the direction from which the vehicles are in arrival, can be activated. In this way, the occupants of the vehicles nearing the portion (2*a*) of road safety barrier (2) where the impact took place can advantageously be alerted, which reduces the possibility of further accidents.

The light signalling electronic devices (17*a*) of the plurality of light signalling electronic devices (17, 17*a*, 18, 19) can be flashing lights (see FIGS. 6-8).

The light signalling electronic devices (17*a*) of the plurality of light signalling electronic devices (17, 17*a*, 18, 19) can be connected to the control unit (8) wirelessly.

FIG. 9 schematically illustrates the electric circuit (3), comprising: the outward electric cable (4); the return electric cable (5); a plurality of junction boxes from $B_1$ a $B_n$, which each comprise a transistor, switched between the outward electric cable (4) and the return electric cable (5), and an impact detecting sensor (6*a*) of the plurality of impact detecting sensors (6), which is connected to the base of the transistor in order to short-circuit the outward electric cable (4) with the return electric cable (5); the termination module (12) which is arranged downstream of this plurality of junction boxes (B1, . . . , $B_n$); the voltage measuring device (7) which is arranged upstream of the junction boxes (B1, . . . , $B_n$); and a direct current generator (11).

FIG. 10 is a detailed illustration of these junction boxes ($B_1$, . . . $B_n$), in particular the jth box ($B_j$).

Under normal conditions, i.e. when the road safety barrier (2) and the electric circuit (3) are integral, the electric current flows through the outward electric cable (4), the termination module (12) and the return electric cable (5), closing in the direct current generator (11), see FIGS. 9, 10. The voltage measuring device (7) measures a first voltage, from which an electrical resistance value can be calculated, given by the sum of the electrical resistance of the outward electric cable (4), of the electrical resistance of the termination module (12) and of the electrical resistance of the return electric cable (5).

Figure 11:
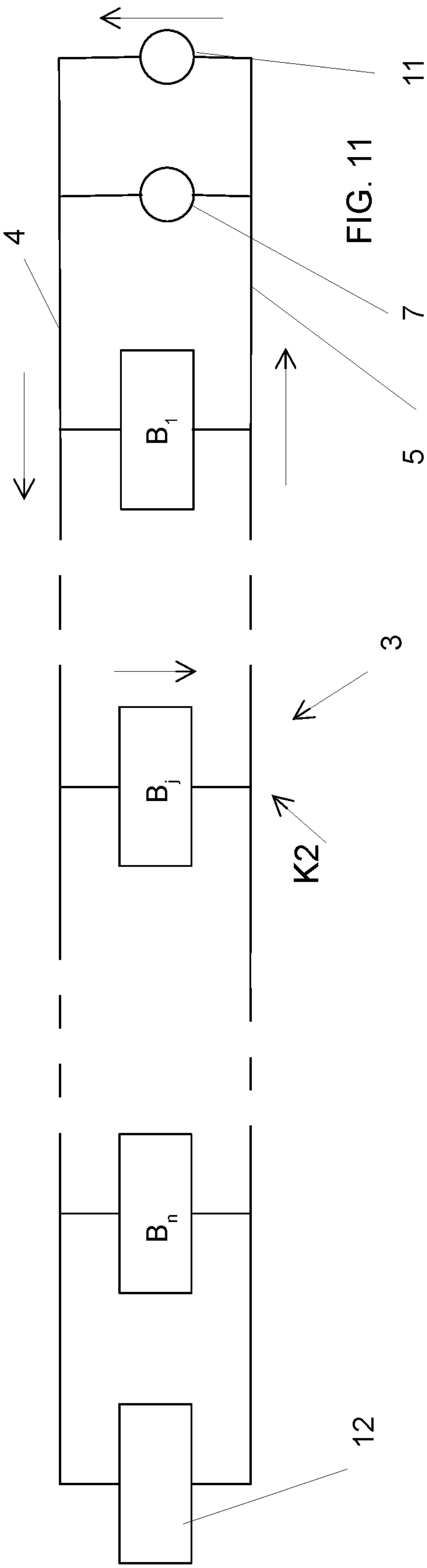
FIG. 11 is a schematic view of the electric circuit of the road safety barrier assembly of FIG. 1 in a second operating condition.
Figure 12:
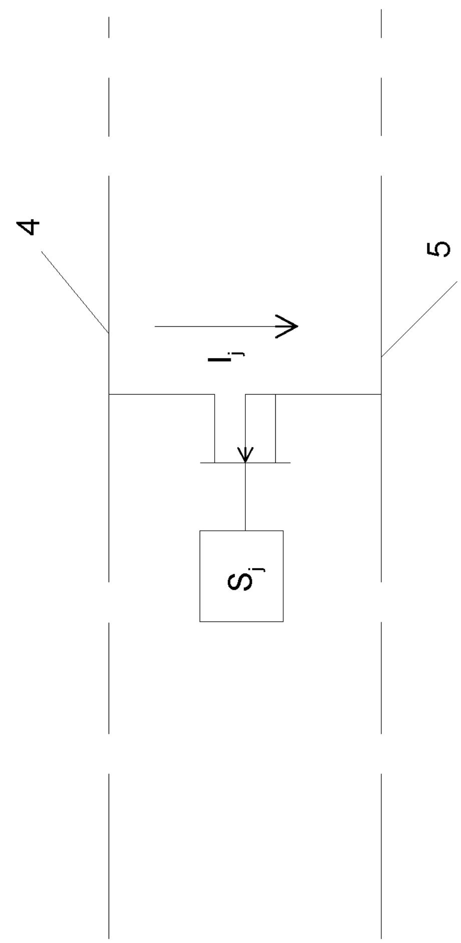
FIG. 12 is a more detailed view of detail K2 of FIG. 11.

If an impact of a vehicle against a portion of road safety barrier (2) is verified where, for example, a jth impact detecting sensor ($S_j$) of the plurality of impact detecting sensors (6) is located, the jth impact detecting sensor ($S_j$) can command the associated transistor ($I_j$) which in turn short-circuits the outward electric cable (4) with the return electric cable (5), with the consequence that the electric current is switched from the outward electric cable (4) onto the return electric cable (5), see FIGS. 11, 12. In this case the voltage measuring device (7) will measure a second voltage, lower than the first voltage, from which an electrical resistance value can be calculated, given by the sum of the electrical resistance of the outward electric cable (4) and of the electrical resistance of the return electric cable (5), both obviously having a lower value than the case illustrated in FIGS. 9, 10. From the resistance value calculated in this way, as already specified, it is easy to calculate the distance between the voltage measuring device (7) and the portion (2*a*) of the road safety barrier (2) where the impact occurred.

Figure 2:
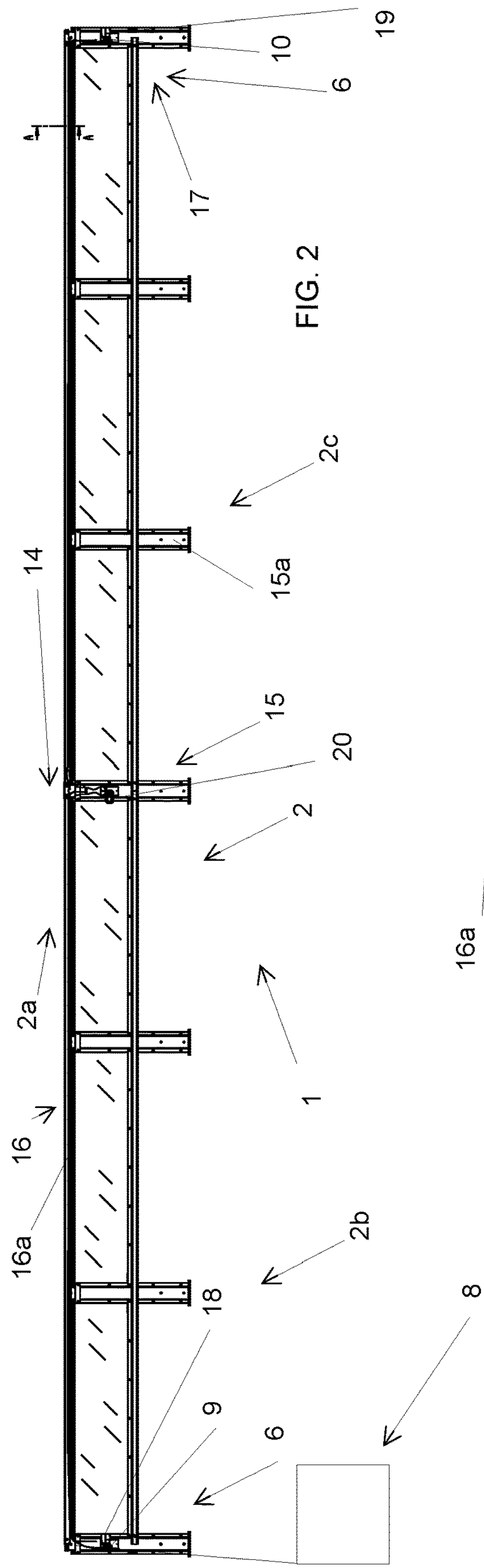
FIG. 2 is a lateral view of the road safety barrier assembly of FIG. 1.
Figure 4:
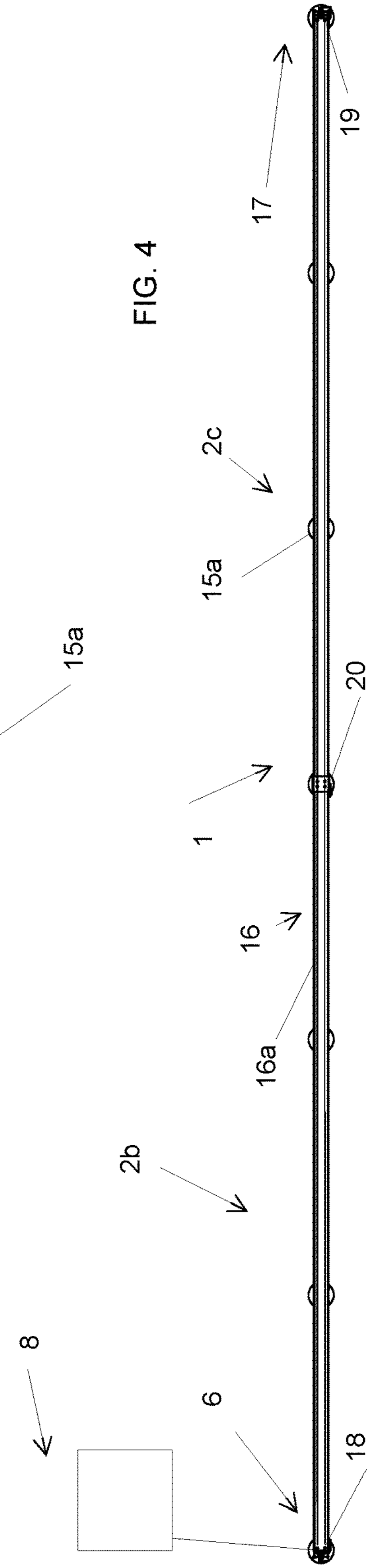
FIG. 4 is a view from above road safety barrier of the road safety barrier assembly of FIG. 1.

FIGS. 1, 2 and 4 illustrate only a part of the road safety barrier assembly (1) showing the first impact detecting sensor (9) of the plurality of impact detecting sensors (6) and the second impact detecting sensor (10) of the plurality of impact detecting sensors (6). FIGS. 1, 2, 4 and 5*a* also illustrate a first light signalling electronic device (18) of the plurality of light signalling electronic devices (17, 17*a*, 18, 19), which comprises a first flashing lamp; the first flashing lamp is arranged in proximity of the first impact detecting sensor (9) of the plurality of impact detecting sensors (6) and, as mentioned in the foregoing, is connected to the control unit (8) (see FIGS. 6-8). Further, FIGS. 1, 2 and 4 also illustrate a second light signalling electronic device (19) of the plurality of light signalling electronic devices (17, 17*a*, 18, 19), which comprises a second flashing lamp; the second flashing lamp is arranged in proximity of the second impact detecting sensor (10) of the plurality of impact detecting sensors (6) and is also connected to the control unit (8).

The road safety barrier assembly (1) can also comprise a plurality of fixed-beam lamps (not illustrated): FIGS. 1, 2, 4, 5*b* also illustrate a fixed-beam lamp (20) of the plurality of fixed-beam lamps.

The plurality of fixed-beam lamps can be activated by the control unit (8) to improve the visibility of a portion of road.

Figure 3:
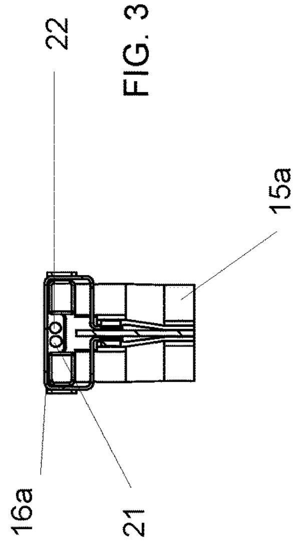
FIG. 3 is a section view, along line A-A, of FIG. 2.

FIG. 3 shows a four-core cable (22) and a two-core cable (21) which are protected by a containing element (16*a*) of the plurality of containing elements (16). The four-core cable (22) contains the outward electric cable (4), the return electric cable (5) and two power cables, positive and negative, of each light signalling electronic device (17*a*) of the plurality of light signalling electronic devices (17, 17*a*, 18, 19). On the other hand, the two-core cable (21) contains two power cables, positive and negative, of each fixed-beam lamp (20) of the plurality of fixed-beam lamps.

The road safety barrier assembly (1), object of the present invention, can have a length of 500 metres, along which a fixed-beam lamp (20) can be arranged very 12 metres from one another and an impact detecting sensor (6*a*) of the plurality of impact detecting sensors (6) every 12 metres from one another, alternating each fixed-beam lamp (20) and each impact detecting sensor (6*a*).

The invention claimed is:

1. A road safety barrier assembly for detecting an impact of a vehicle, comprising:

a road safety barrier; and an electric circuit that can be supplied with direct current, comprising:

an outward electric cable for feeding the electric current and a return electric cable for the return of the electric current, the outward electric cable and the return electric cable both running along the road safety barrier;

a plurality of impact detecting sensors which are distributed along the road safety barrier, so that each impact detecting sensor of the plurality of impact detecting sensors is able to detect an impact of a vehicle against a portion of road safety barrier in which the impact detecting sensor is located;

each impact detecting sensor of the plurality of impact detecting sensors being connected to the electric circuit so that, if it detects an impact of a vehicle against the portion of road safety barrier in which it is located, it causes a switching of the electric current coming from the outward electric cable towards the return electric cable at the same portion of road safety barrier;

a voltage measuring device which is arranged so as to measure a voltage value between the outward electric cable and the return electric cable upstream of the plurality of impact detecting sensors;

a control unit which is predisposed to receive a signal indicating the voltage value measured by the voltage measuring device and which is configured to calculate the distance between the voltage measuring device and the portion of the road safety barrier at which the impact took place, by applying Ohm's Law.

2. The road safety barrier assembly of claim 1, wherein the electric circuit comprises a termination module which is arranged downstream of the plurality of impact detecting sensors, which connects the outward electric cable with the return electric cable and which has a determined electrical resistance value, so as to close the electric circuit.

3. The road safety barrier assembly of claim 1, wherein the impact detecting sensors of the plurality of impact detecting sensors are piezoelectric.

4. The road safety barrier assembly of claim 1, wherein:

the electric circuit comprises a plurality of electric switches; and each electric switch of the plurality of electric switches connects the outward electric cable with the return electric cable and is commanded to close by an associated impact detecting sensor of the plurality of impact detecting sensors in order to switch the electric current coming from the outward electric cable towards the return electric cable.

5. The road safety barrier assembly of claim 4, wherein each electric switch of the plurality of electric switches connects the outward electric cable with the return electric cable so that when it is commanded to close by an associated impact detecting sensor of the plurality of impact detecting sensors, it places the outward electric cable and the return electric cable in short circuit with one another.

6. The road safety barrier assembly of claim 1, wherein the road safety barrier comprises:

a plurality of re-directing elements for re-directing a vehicle which impacts against the road safety barrier;

a plurality of support elements for supporting the plurality of redirecting elements; and a plurality of containing elements for containing the outward electric cable and the return electric cable, which extend longitudinally and which are borne by the plurality of support elements.

7. The road safety barrier assembly of claim 1, comprising a plurality of light signalling electronic devices which are distributed along the road safety barrier and which are connected to the control unit so that in a case of impact of a vehicle against the road safety barrier, at least a part thereof, arranged upstream of the portion of road safety barrier in which the impact took place with respect to the direction from which the vehicles are in arrival, can be activated.

* * * * *